US006345213B1

(12) United States Patent
Graeser et al.

(10) Patent No.: US 6,345,213 B1
(45) Date of Patent: Feb. 5, 2002

(54) CONTROL METHOD FOR AN INDUSTRIAL ROBOT

(75) Inventors: Ralf-Gunter Graeser, Munich; Robert Klingel, Eching, both of (DE)

(73) Assignee: Institut fuer Werkzeugmaschinen und Betriebswissenschaften TU Muenchen (DE)

( * ) Notice: Subject to any disclaimer, the term of this patent is extended or adjusted under 35 U.S.C. 154(b) by 0 days.

(21) Appl. No.: 09/700,438
(22) PCT Filed: May 14, 1999
(86) PCT No.: PCT/DE99/01468
  § 371 Date: Feb. 14, 2001
  § 102(e) Date: Feb. 14, 2001
(87) PCT Pub. No.: WO99/60452
  PCT Pub. Date: Nov. 25, 1999

(30) Foreign Application Priority Data

May 15, 1998  (DE) .......................................... 198 21 873

(51) Int. Cl.[7] .............................................. G06F 19/00
(52) U.S. Cl. ....................... 700/245; 700/174; 700/251; 700/259; 414/744; 414/1; 414/744.4; 414/729; 414/815; 414/917; 901/9; 901/23; 901/32; 901/42; 901/46; 901/47; 219/124.34
(58) Field of Search ................................. 700/245, 174, 700/251, 259; 414/744.1, 744.4, 729, 815, 917, 800; 901/9, 23, 36, 42, 46, 47; 73/1.79; 219/124.34

(56) References Cited

U.S. PATENT DOCUMENTS

| | | | |
|---|---|---|---|
| 4,668,157 A | | 5/1987 | Kato et al. ................... 414/730 |
| 4,969,108 A | * | 11/1990 | Webb et al. .................. 700/259 |
| 4,986,724 A | * | 1/1991 | Steinmetx et al. ........... 414/729 |
| 5,201,106 A | * | 4/1993 | Moore et al. ............. 29/407.05 |
| 5,400,638 A | | 3/1995 | Kim ............................ 73/1.79 |
| 6,078,846 A | * | 6/2000 | Greer et al. ................. 700/174 |

FOREIGN PATENT DOCUMENTS

| | | |
|---|---|---|
| DE | 33 02 063 A1 | 1/1983 |
| EP | 0625739 A1 | 11/1994 |
| WO | WO 97/43703 | 11/1997 |
| WO | WO 97/46925 | 12/1997 |

OTHER PUBLICATIONS

Logt et al., A numerical appraoach for planning robot trajectories considering collision avoidance, 1996, IEEE, pp. 1501–1507.*
Grahn et al., TCP position tolerances in joint torque minimizations, 1998, IEEE, pp. 800–805.*
"Programmable Very Low Frequency Magnetic Compensation For Displays" *IBM Technical Disclosure Bulletin,* vol. 32, No. 2, Jul. 1, 1989, pp. 440–441.
Soons, J.A. et al.: "Modeling the errors of multi–axis machines: a general methodology", *Precision Engineering,* vol. 14, No. 1, Jan. 1992, pp. 5–19.

* cited by examiner

Primary Examiner—William A. Cuchlinski, Jr.
Assistant Examiner—McDieunel Marc
(74) Attorney, Agent, or Firm—Brian N. Young; Townsend and Townsend and Crew LLP

(57) ABSTRACT

A method provides an exact measurement of the tool center point (TCP) being carried out, preferably in the whole working area of the robot. In this measurement, the robot moves very slowly so that little heat is generated by the driving assemblies and the temperature gradients are as low as possible. The measurement can be made, for example, using a high-precision laser distance and angle measurement system. The measurement is carried out such that a measuring point is moved to working area points and then the deviations of the positions and/or orientations of the measuring point are determined using the laser distance and angle measurement system, i.e. a nominal/actual comparison is made. The TCP can preferably serve as the measuring point. The point must always be selected so that the positioning and orientation deviations of the kinematic chain with respect to the PCT can be determined with sufficient accuracy.

13 Claims, 2 Drawing Sheets

CONTROL METHOD FOR AN INDUSTRIAL ROBOT

BACKGROUND OF THE INVENTION

1. Field of the Invention

The invention relates to a control method for an industrial robot, in the following a robot, for the reduction of the influence of temperature changes on the positioning and orientation accuracy of the robot hand, in the following termed the tool center point (TCP) of the robot.

2. Description of the Prior Art

In the following, positioning accuracy is understood to mean the property of the robot to position the TCP at a pre-determined spatial coordinate x, y, z.

Orientation accuracy is understood to be the property to orient the TCP at a respective pre-determined angle $\angle x$, $\angle y$, $\angle z$ at the spatial coordinate x, y z.

As accuracy requirements increase and stable and rugged process procedures are required, high demands come to be made with respect to the positioning and orientation accuracy. Particularly when a robot is in permanent operation, a drift in positioning and orientation accuracy can be determined whose cause is thermal sources which produce a deformation in the kinematic chain of the robot.

For technical reasons, it is not possible to completely prevent the temperature influence on the kinematic chain, since the drive assemblies of the kinematic chain generate heat under load, which results in changes in length and angle of the same in dependence on time. Nor can these effects be fully excluded by a thermo-symmetrical design.

To reduce positioning and orientation errors which arise due to the effect of temperature, the attempt is known from the prior art to measure the current temperatures at pre-determined points of components at selected points of the kinematic chain of a robot and to use these temperature measurement values for the correction of the position of the TCP by means of a computer.

For instance, a device is described in DE 33 02 063 for the compensation of influencing variables in machine tools or measuring machines and in robots. It is proposed to measure practically all the influencing variables which occur, such as temperatures and loads, and then to superimpose correction values on them which had been previously determined for all these influencing variables in order to thus achieve a compensation of the positioning error caused by the influencing variables.

The basic inventive idea of DE 33 02 063 accordingly comprises determining each influencing variable using a measuring device suitable for this purpose, i.e. the influencing variable "temperature" is determined by means of a temperature measuring device, the influencing variable "deformation by loading" is determined using a force measuring device, etc.

The inventors of the present invention have found, specifically for the correction of positioning and orientation errors arising due to temperature influences, that the method proposed in DE 33 02 063 is extremely complex and often cannot be carried out in practice. It has been found that the instruction given in DE 33 02 063 to arrange temperature sensors at selected points of a machine (in this case a robot) does not lead to the desired result since no sufficient correlation can be made between the temperature measured at the robot and the positional shift of the TCP which actually occurs with respect to the desired value.

For this reason, this compensation philosophy was not pursued further by the inventors of the present method.

Further devices for temperature compensation are described in the following documents.

U.S. Pat. No. 4,668,157 discloses a robot with a device for temperature compensation. The calibration cycle is triggered when the temperature at pre-determined points of the arm elements of the robot reach a pre-determined value. In this method, the current temperature at a pre-determined point at the robot arm is also put into correlation with the positional shift of the TCP.

U.S. Pat. No. 5,400,638 discloses a device for the calibration of a robot where thermally invariable reference bodies are used. The thermally induced changes in arm length are determined using the least squares method, with changes in angle being neglected.

SUMMARY OF THE INVENTION

It is the object of the invention to further improve the positioning and orientation accuracy of a robot in order to eliminate the above-mentioned problems.

The basic idea of the invention comprises an exact measurement of the tool center point (TCP) being carried out, preferably in the whole working area of the robot, in a zeroth method step. Temperature changes in the working area and in the robot itself are largely avoided here. In this measurement, the robot moves very slowly so that little heat is generated by the driving assemblies and the temperature gradients are as low as possible. The measurement can be made, for example, using a high-precision laser distance and angle measurement system. The measurement is carried out such that a measuring point is moved to working area points and then the deviations of the positions and/or orientations of the measuring point are determined using the laser distance and angle measurement system, i.e. a nominal/actual comparison is made. The TCP can preferably serve as the measuring point. However, a different point on the kinematic chain can also be selected. The point must always be selected so that the positioning and orientation deviations of the kinematic chain with respect to the PCT can be determined with sufficient accuracy.

The positioning and orientation errors determined in this measurement are termed stationary errors. A stationary error model, which forms a first basis for the correction of the temperature-induced deviations, is developed by known mathematical methods from the measurement of a great number of spatial points in the working area.

In the first, i.e. the next, method step, the same spatial points are again moved to as in the zeroth method step, with in particular the movement speed being substantially increased, whereby heat is generated in the drives of the kinematic chain and said heat results in the translatory and/or rotary deviations already described of the measuring point from the nominal value. These deviations Au are also stored, with a thermal error model, which describes the respective current thermal state of the kinematic chain, being prepared using mathematical methods known to one skilled in the art.

The zeroth and first method steps are usually only carried out once or at fairly large intervals, in particular after repairs.

In the second method step, a first subset U1 is determined from the set of spatial points measured. Only such spatial points are selected for this subset U1 which have such a temperature drift behavior which is representative for the temperature drift behavior of all spatial points; i.e. the temperature drift behavior of a point from the subset U1 is in each case in a predetermined proportion to the remaining spatial points. This predetermined proportion is determined in the next method step.

In the third method step, temperature-stable reference points $RP_{U1}$ are arranged at the spatial coordinates of the subset U1 in the working area of the robot. A measuring device is fixedly arranged at the same position at the previously used measurement point and the positioning and orientation deviations of the measuring point are determinable with respect to the reference points $RP_{U1}$ using said measuring device. The measuring device is moved to the reference points $RP_{U1}$ between the working actions of the robot in accordance with a predetermined time sequence or predetermined criteria, with the current positional and orientation deviations being determined by means of a measurement of distance and angle from the respective reference point.

Temperature-stable bodies having measurement marks for the optical distance and/or angle measurement are used as reference points $RP_{U1}$, for example. It is necessary to select those spatial points from the plurality of determined representative spatial points, which are suitable as reference points $RP_{U1}$, at which the temperature-stable bodies do not impede the movement area of the robot and of the workpiece which is moved in and out. Systems which work in a non-contact method (such as optical methods) are suitable as measuring systems, as are tactile systems (such as inductive path measurement using a moving coil).

In the fourth method step, the current positioning and orientation errors between the measuring point and the reference points $RP_{U1}$ are fed to the computer. The error model is adapted in the computer to the current thermal state of the kinematic chain of the robot on the basis of the measurement values determined and fed to the control electronics so that it is now again possible to move exactly to all points in the working area.

It is, however, clear that the error model must in particular supply an exact description of the kinematic chain of the robot for such regions in the working area in which the robot carries out the working actions.

This method has the following advantages over the methods known from the prior art:

it is usable in any type of robot;

it is simple;

for example, the extremely time-consuming search for correlations between the surface temperature of a component and the associated positioning and orientation error is dispensed with.

In a further development of the method, only the positioning errors are measured, i.e. the technical measurement effort is reduced; however, under certain circumstances also the accuracy of the error model.

In a further development of the method, only the orientation errors are measured, i.e. the technical measurement effort is reduced; however, also the accuracy of the error model.

In a further development of the method, the zeroth method step is not carried out and the measurement values to be determined are replaced by average values typical for the apparatus, whereby the working effort is reduced; however, under certain circumstances also the accuracy of the error correction.

In a further development of the method, the zeroth and first method steps are not carried out and the measurement values to be determined are replaced by average values typical for the apparatus, whereby the working effort is reduced; however, also the accuracy of the error correction.

In a further development of the method, a subset U2 is determined whose points only have a representative temperature drift for a selected region of the working area. This further development is expedient when the robot is always only in active movement in a partial region of the working area.

In a further development of the method, further subsets U3 to UN are determined whose points have a representative temperature drift for a selected respective region of the working area. This further development is expedient when the robot is in active movement in different, but predetermined, partial regions of the working area.

In a further development of the method, the measuring point is moved to the individual spatial points not only from one direction in the zeroth and first method steps, but from different directions. As each of the movement directions can result in a different deviation, more data is thus gained for the error model, whereby the error model becomes more accurate. The positioning and orientation accuracy of the robot can be further improved in this way.

In a further development of the method, such spatial points are selected from a subset which lie approximately on a straight line. It is possible with this measure to provide a very simple calibrating body, which lowers the device costs. In this case, a conventional precision rule is put into alignment with the straight line. Measurement marks are arranged on the precision rule and these are scanned by conventional measuring systems using a measuring head.

In a further development of the method, a sphere or a prismatic body is used as the reference body instead of the precision rule. Reference bodies of simple geometrical design can be produced with great precision at no great cost.

The further development of the method is to be preferred when the spatial points suitable as reference points do not lie on or in geometrically simple bodies. Accordingly, a temperature-stable wire is bent such that it extends through the spatial points suitable as reference points.

It is obvious to one skilled in the art that the reference bodies must always be arranged such that the work process is not impeded, i.e. that the reference bodies hinder neither the movement of the robot nor the movement of the workpieces or other devices.

The special advantage is to be emphasized that the method in accordance with the invention can be used irrespective of the constructive type of the robot. Furthermore, the invention can be used both with new robots and with those already in operation.

DETAILED DESCRIPTION OF SPECIFIC EXEMPLARY EMBODIMENTS

Figure 1:
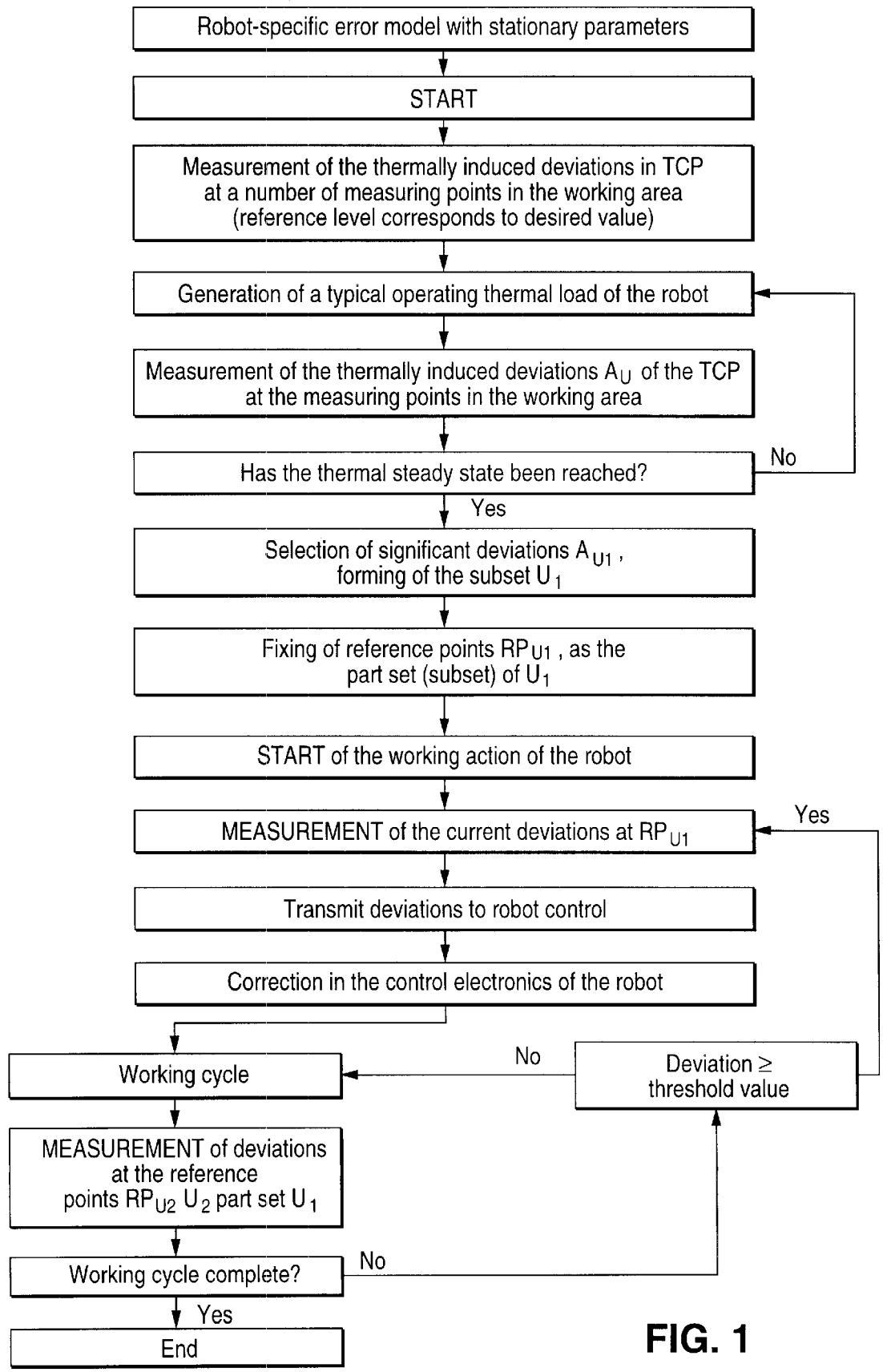
FIG. 1 shows an embodiment of a program flowchart of the method in accordance with the invention.

In the following, the usual practical procedure is described for the use of the invention with a six-axial vertical bending arm robot with an open kinematic chain and a closed four-joint chain for the control of the second and third axes.

1. Use of the Method in Accordance with the Invention Including the Generation of the Error Model Before Use in Production 1.1 Required Equipment for the Determining of the Error Model on the Robot robot with control;

non-contact 3D distance measuring system (laser tracker system) to determine the absolute positional data;

PC with calibrating software for positional data detection and for modeling, identifying and evaluating the model parameters.

1.2 Generation of the Error Model

The procedure for the generating of the error model can be divided into the following three-part steps:

model formation: description of the end effector pose (position and orientation) of the robot by a function of the position of the moving axes and the model parameters to be calculated;

measurement: precise measurement of the position of the end effector at selected working area positions;

identification: numerical calculation of the model parameters, starting from the nominal model, so that positional and track deviations between the model function and the measurements become minimal.

1.2.1 Modeling of Static and Thermal Parameters

A so-called nominal model is used for the movement planning of the robot described here. The description of the end effector pose is carried out by transformation matrices which result from the angle values of the six axial measurement systems and the axial lengths (nominal dimensions) known from the blueprints of the robot.

An extended mathematical model, the so-called error model, is compiled using the calibrating software for a more exact description of the real robot. This model describes the pose of the end effector as a function of the angle values of the six rotary axes and of the parameters of the error model to be quantified later during identification.

The modeling contains the following stationary parameters (mapping of error parameters induced by design, production and assembly):

length of the individual axial elements (base, lower arm, upper arm, hand);

skew of in each case two moving axes with respect to one another;

zero position error of the angle measuring systems of the rotary axes;

transmission error (eccentricity, elasticity and play);

joint inaccuracies (elasticity and play); and load influences (component elasticity).

The composition of the parameters to be identified can be freely selected by the user. The accuracy increases with the number of parameters used.

The following thermal parameters are included for the modeling of the thermal state of the robot kinematics and the temperature drift resulting therefrom:

thermally induced changes in axial length;

change in the skew of the moving axes due to thermally induced 2D and 3D deformations of the axial elements;

transmission inaccuracies/irregularities due to thermally induced strains or change in play;

variable joint and bearing play due to thermal strains of the rotary axial bearings.

1.2.2 Measuring the Positioning and Orientation Accuracy of the Robot

The absolute precision of the robot in the working area is determined using the laser tracker system. The end effector positions measured, together with the nominal poses known from the robot control, are the input data for calculating the model parameters.

When selecting the end effector positions to be measured, care must be taken that these are uniformly distributed in the complete working area. The greater the working area volume utilized for the measurements, the more precisely the calculation of the model parameters can be carried out.

The degree of detail of the error model (number of parameters to be identified) determines the required number of poses to be measured.

1.2.3. Identification of the Stationary Parameters

To determine the stationary parameters (error parameters induced by design, production and assembly) of the error model, the robot is moved to the working area positions determined at 1.2.2. under stationary conditions and measurements taken. A total of 100 different end effector poses have to be measured with the robot in question to identify the parameter types listed at 1.2.1.

The identification of the stationary parameters is carried out in this example:

at a constant room temperature (20° C.±2K);

under nominal load (at the robot hand); and using a track speed of 25 mm/s for moving to and between the measuring poses (avoidance of significant loss performance in the drives due to low movement speed).

The positions to be measured are moved exactly (without carryover) by the robot, measured absolutely precisely with respect to the robot basic coordinate system by the laser tracker system and stored in a file together with the corresponding nominal positional data from the robot control.

The stationary parameters numerically calculated from these data describe the real robot model (stationary error model) and form the reference basis for the subsequent identification of the thermal parameters (thermally induced error parameters).

1.2.4. Identification of the Thermal Parameters

To identify the thermal parameters, the end effector poses determined at 1.2.2. must be moved at regular intervals in so-called measuring cycles. The track speed between the individual measuring points is $v=v_{max}$ [mm/s].

The thermal state of the robot structure is systematically changed by a load program between the individual measuring cycles. For this purpose, the robot is moved continuously between two working area points at $v=v_{max}$ [mm/s]. Every rotary axis sweeps over an angle of 60° between these working area points. A maximum load and thus a great heating of all axes is ensured by the load at the robot hand (nominal load, cf. 1.2.3.).

This load program is interrupted by a measuring cycle for approximately 1 min. every 10 mins. and is repeated in cycles until the thermal steady state is reached. The steady state is reached with the robot in question after approximately 6 to 8 hours. The measured thermally induced positional and/or orientation deviations (temperature drift) are stored for each measuring point in a file.

Once the thermal steady state has been reached, the collected positional deviations are evaluated using the calibrating software.

The temperature drift at each measuring point and the corresponding nominal positional and/or orientation data (also called pose data in the following) from the robot control are the input data for the calculation of the thermal parameters.

The result of this evaluation is a catalog of variable parameters which contains the change in the values of the stationary parameters in dependence on the thermal state and the time of examination.

1.2.5. Selection of Significant Thermal Parameters

Using statistical assessment methods, those thermal parameters of the error model must be selected from the catalog prepared at 1.2.4. which describe the greatest thermally induced degree of change and thus the most significant influence on the temperature drift.

Depending on the construction setup of the kinematics, in the robot in question here these are the axial length changes Δa, Δb, Δc, Δd, Δe, Δf and the transmission inaccuracies in the main axes ΔA1, ΔA2, and ΔA3.

To compensate for the temperature drift, these nine significant parameters must be updated during operation in dependence on the thermal state and implemented into the motion planning of the robot.

1.2.6. Composition of the Thermal Error Model

After the identification of the stationary and significant thermal parameters, the thermal error model is set up for the exact planning of the motion.

All stationary parameters are entered in the mathematical algorithms for motion planning in accordance with the modeling carried out at 1.2.1 and declared to be invariable.

The significant thermal parameters determined at 1.2.5. (in the present case Δa, Δb, Δc, Δd, Δe, Δf, ΔA1, ΔA2, ΔA3) are in contrast declared as variable.

Thus, an updating of these parameters can be made during operation in dependence on the degree of deformation. The values identified as stationary parameters for the robot at 1.2.3. form the reference base and the starting value for the thermal parameters determined.

1.2.7. Inclusion of the Thermal Error Model in the Motion Planning

An adaptation of the control model (thermal error model) must be made to include the thermal parameters in the planning of position and track. As the thermal parameters are variable, a possibility must be provided for a regular comparison of the thermal error model in operation.

In the present robot to be calibrated, a nominal model is used for the positional and orientation calculation. There is thus no mathematical description of the kinematics in this robot control which would allow an inclusion of the static and thermal parameters determined. Moreover, no change to the system parameters can be made during operation in the current control software.

For these reasons, the thermal error model has to be implemented on an external PC connected to the robot control via a serial interface. A converter must be available on the PC to take the thermally induced effects into account. Positional data calculated using the thermal error model are converted into positional data of the nominal model in this converter.

The nominal positions, which have been corrected in this way by taking the thermal parameters (temperature drift) into account, are then transmitted to the robot control via the serial interface and put at the disposition of the robot programs to be worked through.

2. Use of the Invention for the Example of a "Measuring Robot"

Robots are intended for use in future for the flexible automation of measuring procedures, for example in the automobile industry. A laser-optical measuring system is arranged at the robot hand for the measurement of the accuracy to gauge of body parts.

An obstacle to use is the inadequate positioning behavior—due to thermal influences which vary with time and are dependent on operation. The calibrating method described can be used to minimize these effects. The apparatuses required for this and the procedure are described in the following.

2.1 Apparatuses for Online Calibration

The basis of temperature drift compensation is the determination of the current positional deviation of the robot end effector at reference positions in the working area. The measuring system arranged at the robot hand is used to measure the translatory positional deviation.

Steel cubes are used as reference bodies and are positioned in a stationary manner on rods made of invar steel in the working area which have high dimensional stability in the face of temperature fluctuations.

A total of nine reference points were set up to identify the significant parameters (cf. 1.2.5). Said reference positions can be at any position—care only having to be taken that the largest possible differences in axial angles are realized between the individual positions.

2.2. Calibrating Cycle

A so-called calibrating cycle with the following procedure is defined to compensate for the temperature drift at the working area positions used:

motion program to measure the positional deviation at the reference bodies;

calculation of the thermal parameters and updating of the thermal error model;

calculation of the corrected working area positions for each measurement position contained in the robot program;

conversion of the calculated working area positions into corrected nominal working area positions;

transmission of the corrected nominal working area positions (measurement positions) to the robot control.

2.3 Integration of Online Calibration into the Production Process

The production process "measurement of body parts" is divided into two routines—the calibrating cycle (see section 2.2.) and the working cycle (measurement operation, measuring of the body part).

Before beginning production (start of production after the weekend, product change) or after a production interruption (downtime operation, maintenance, etc.), a calibrating cycle is generally carried out to update the thermal error model and to correct all measuring points. The measuring operation (working cycle) can subsequently be resumed.

To be able to ensure a uniformly high measuring accuracy during operation, a regular comparison must be made of the thermal error model on the basis of the current deformation state of the robot.

To avoid auxiliary process times caused by every calibrating cycle, a deformation-dependent control of the time intervals between two following calibration cycles is introduced.

The control is based on the cyclic monitoring of the positioning and orientation accuracy of the robot at one of the reference bodies. The monitoring of accuracy is integrated in the working cycle. The decision of whether a calibrating cycle is necessary again or whether the next working cycle can be executed is made using the current positional deviation at this reference body.

The threshold value in the present embodiment was set at a summary deviation of $\geq 0.1$ mm with respect to the deviation at the reference body measured prior to the last compensation cycle.

The reference body for the monitoring of the current positioning and orientation accuracy must be positioned such that the moving to this position can easily be integrated into the movement routine of the working cycle.

It is obvious to one skilled in the art that the method described above can be modified without departing from the basic idea of the invention.

Figure 2:
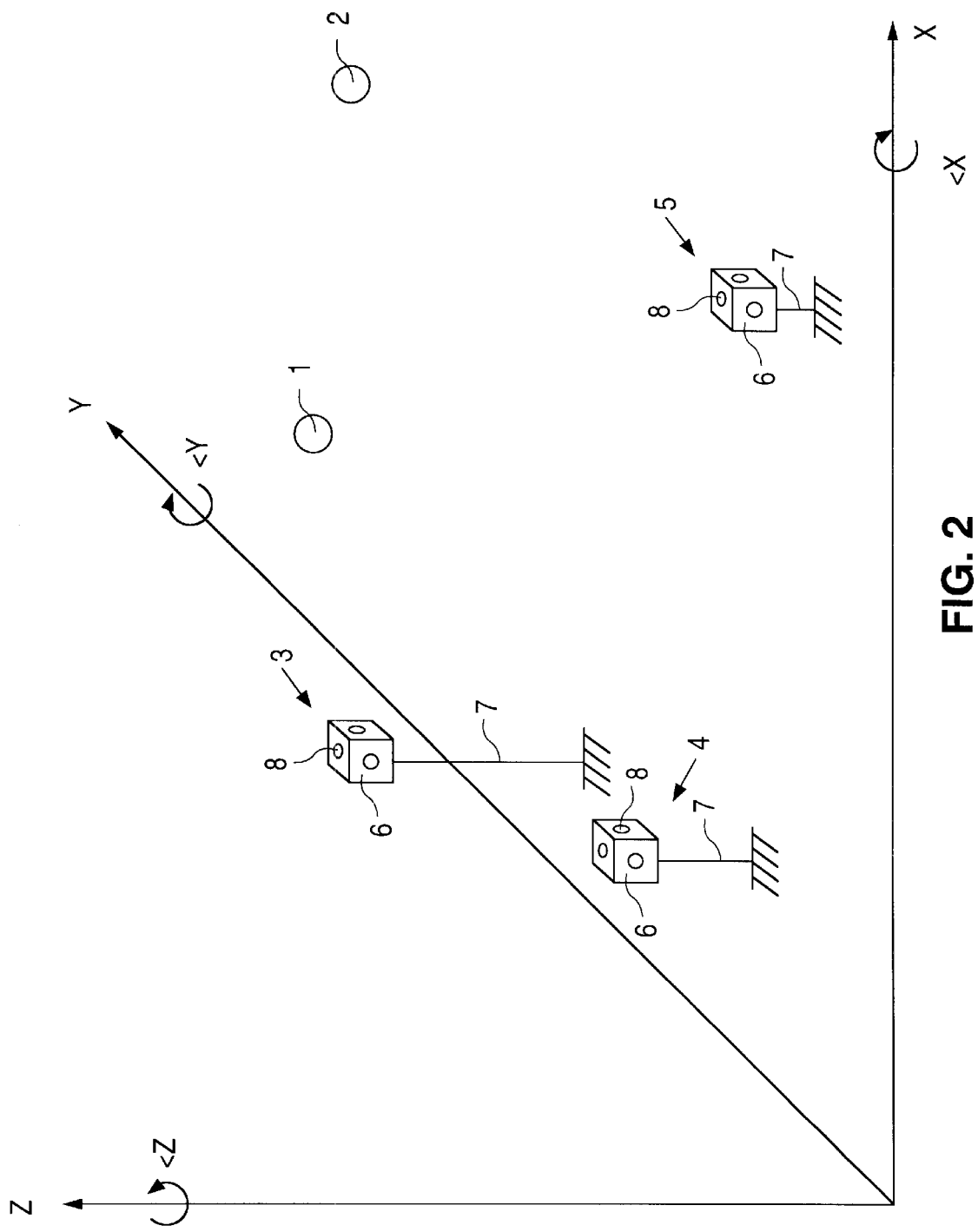
FIG. 2 shows a calibrating device for use in the method.

The method is described again in more detail in principle in the following with reference to an apparatus in accordance with FIG. 2.

The working area of a robot is shown schematically by the coordinate system x, y, z. There is a plurality of reference points $RP_{U1}$ within this working area, with only 5 being shown. Two of the reference points $RP_{U1}$ are shown as circles 1 and 2. These reference points lie in the motion region of the robot (not shown) and are therefore not suitable as physical reference points. The remaining three reference points 3, 4, 5 are not in the motion region of the robot. As a result, physical reference points can be installed at their spatial coordinates. In the present example, these are steel cubes 6 which are attached to rods 7. The rods 7 are anchored to the floor and are made of a material having a particularly low thermal coefficient of expansion. Bores 8 serving as measurement marks are present in the steel cubes 6.

If it is determined that the robot should be calibrated at the three reference points 3, 4, 5, the coordinates of the reference points are advised to the robot control and the robot is moved to these coordinates. An optical distance and angle measuring system, arranged in this case near the TCP, is used to determine the deviations between the positions and orientations of the reference point to be moved to and the spatial point actually moved to and to feed them to the computer where correction values for positional correction are calculated using the error model. These correction values are fed to the robot control in order to correct the positioning and orientation errors of the TCP.

The method may also be used in an analog manner.

What is claimed is:

1. A control method for a robot for the reduction of the influence of temperature changes on the positioning and orientation accuracy of the robot, the robot having a control apparatus and a computer, the method comprising:

in a zeroth method step, moving the robot, in whose kinematic chain a measuring point is arranged, slowly with the measuring point to a plurality of spatial points in the working area of the robot at a constant ambient temperature, wherein the coordinate values ($x_a$, $y_a$, $z_a$ and $\angle x_a$, $\angle y_a$, $\angle z_a$) of the measuring point are accurately measured at individual points of the working area using an external measurement system and stored; and comparing said coordinate values with respective coordinate values ($x_R$, $y_R$, $z_R$ and $\angle x_R$, $\angle y_R$, $\angle z_R$) made available by the robot and being stored as deviations ($A_{stationary}$), with said deviations ($A_{stationary}$) being the first basis of an error model describing the kinematic chain at a constant temperature;

in a first method step, moving the robot such that heat is generated in drives of the kinematic chain and then the measurement of the measuring point carried out in the zeroth method step is repeated at least one time; and storing the deviations determined as deviations due to temperature $A_{thermal}$, with the deviations $A_{thermal}$ a being a second basis of the error model describing the kinematic chain in the current thermal state;

wherein the zeroth and first method steps serving for basic calibration and only being carried out once or at fairly large intervals;

in a second method step, determining a first subset U1 from the spatial points measured, with spatial points of said subset U1 having a representative temperature drift behavior representative for a temperature drift behavior of all spatial points;

in a third method step, arranging temperature-stable reference points $RP_{U1}$ at spatial coordinates of the first subset U1 in the working area of the robot and arranging a measuring device at the measuring point of the robot, moving the measuring device to the reference points $RP_{U1}$ between the working actions of the robot in accordance with a pre-determined time sequence or pre-determined criteria, with the current positional deviation of the measuring point being determined by means of a measurement of distance and angle from the respective reference point; and in a fourth method step, feeding the current positional deviations between the measuring point and the reference points $RP_{U1}$ to the computer, wherein the computer calculates correction data for all spatial points of the working area from the error model determined in the zeroth and first method steps and feeding said correction data to control electronics of the robot in order to correct positioning and orientation errors of all spatial points from the determined positioning and orientation errors of the reference points $RP_{U1}$.

2. A method in accordance with claim 1, wherein only the positioning errors are determined.

3. A method in accordance with claim 1, wherein only the orientation errors are determined.

4. A method in accordance with claim 1, wherein the measurement values to be determined in the zeroth method step are replaced by known average values typical for the apparatus, with the zeroth method step being omitted.

5. A method in accordance with claim 1, wherein the measurement values to be determined in the zeroth and first method steps are replaced by known average values typical for the apparatus, with the zeroth and first method steps being omitted.

6. A method in accordance claim 1, further comprising a subset $U_2$, wherein the subset $U_2$ is determined with points that have a representative temperature drift only for a selected region of the working area.

7. A method in accordance with claim 6 further comprising subsets $U_3$ to $U_N$, wherein subsets $U_3$ to $U_N$ are determined with points that have a representative temperature drift only for a respective selected region of the working area.

8. A method in accordance with claim 1, wherein the measuring point is moved to the spatial points from different directions in the zeroth and first method steps, with the deviations determined being taken into account in the correction as direction-dependent deviations $A_{UR}$.

9. A method in accordance with claim 1, wherein the spatial points are selected from a subset lying approximately on a straight line.

10. A method in accordance with claim 1, wherein the spatial points are selected from a subset lying approximately on or in a sphere or on or in a prismatic body.

11. A method in accordance with claim 1, wherein the spatial points are selected from a subset lying approximately on a spatial or areal shape which can be reproduced from a wire structure.

12. A method in accordance with claim 1, wherein the measuring point is arranged at a tool center point.

13. A method in accordance with claim 1, wherein the zeroth and first method steps serving for basic calibration are carried out after repairs.

* * * * *